US010728488B2

(12) United States Patent
Boyle et al.

(10) Patent No.: US 10,728,488 B2
(45) Date of Patent: Jul. 28, 2020

(54) TRACKING CAMERA NETWORK

(71) Applicant: H4 Engineering, Inc., San Antonio, TX (US)

(72) Inventors: Christopher T. Boyle, San Antonio, TX (US); Konstantin Othmer, Palo Alto Hills, CA (US); Gordon Jason Glover, Carlsbad, CA (US); Alexander G. Sammons, San Antonio, TX (US)

(73) Assignee: H4 Engineering, Inc., San Antonio, TX (US)

( * ) Notice: Subject to any disclaimer, the term of this patent is extended or adjusted under 35 U.S.C. 154(b) by 267 days.

(21) Appl. No.: 15/741,262

(22) PCT Filed: Jul. 2, 2016

(86) PCT No.: PCT/US2016/040903
§ 371 (c)(1),
(2) Date: Dec. 30, 2017

(87) PCT Pub. No.: WO2017/007735
PCT Pub. Date: Jan. 12, 2017

(65) Prior Publication Data
US 2018/0205906 A1 Jul. 19, 2018

Related U.S. Application Data

(60) Provisional application No. 62/188,575, filed on Jul. 3, 2015.

(51) Int. Cl.
*H04N 5/77* (2006.01)
*G11B 27/031* (2006.01)
(Continued)

(52) U.S. Cl.
CPC ............... *H04N 5/77* (2013.01); *G07C 1/22* (2013.01); *G11B 27/031* (2013.01); *H04N 5/23245* (2013.01); *H04N 7/181* (2013.01); *H04N 7/188* (2013.01); *H04N 21/4223* (2013.01); *H04N 21/4334* (2013.01)

(58) Field of Classification Search
None
See application file for complete search history.

(56) References Cited

U.S. PATENT DOCUMENTS 5,694,514 A 12/1997 Evans et al.
D684,210 S 6/2013 Boyle et al.
(Continued)

FOREIGN PATENT DOCUMENTS

EP 2840558 A2 2/2015
WO 2014081767 A1 5/2014

*Primary Examiner* — Lindsay J Uhl
(74) *Attorney, Agent, or Firm* — Volk & McElroy, LLP; Michael D. Volk, Jr.

(57) ABSTRACT

Existence of instrumentation for automatic video recording creates an excess capacity of video recording for those who own automatic video recorders. Others may want to utilize this excess capacity to record their activities thus there is a need for a system that helps match those who would like to utilize the excess capacity with those who have such capacity. Such excess capacity is matched with demand to use such excess capacity by creating a network of automatic video recording units and tags that are associated with people who want to be recorded.

7 Claims, 5 Drawing Sheets

(51) Int. Cl.
*H04N 21/433* (2011.01)
*H04N 7/18* (2006.01)
*G07C 1/22* (2006.01)
*H04N 5/232* (2006.01)
*H04N 21/4223* (2011.01)

(56) References Cited

U.S. PATENT DOCUMENTS

| | | |
|---|---|---|
| D703,719 S | 4/2014 | Boyle et al. |
| 8,704,904 B2 | 4/2014 | Boyle et al. |
| D704,762 S | 5/2014 | Boyle et al. |
| 8,749,634 B2 | 6/2014 | Taylor et al. |
| D714,374 S | 9/2014 | Sammons et al. |
| 8,836,508 B2 | 9/2014 | Taylor et al. |
| D726,808 S | 4/2015 | Sammons et al. |
| 9,007,476 B2 | 4/2015 | Glover |
| 9,160,899 B1 | 10/2015 | Boyle et al. |
| 9,253,376 B2 | 2/2016 | Boyle et al. |
| D750,693 S | 3/2016 | Sammons et al. |
| 9,294,669 B2 | 3/2016 | Glover |
| 9,313,394 B2 | 4/2016 | Boyle et al. |
| 9,456,174 B2 | 9/2016 | Boyle et al. |
| 9,565,349 B2 | 2/2017 | Taylor et al. |
| 9,578,365 B2 | 2/2017 | Boyle et al. |
| 9,723,192 B1 | 8/2017 | Sammons et al. |
| 9,730,330 B1 | 8/2017 | Boyle et al. |
| 2009/0058611 A1* | 3/2009 | Kawamura ............ H04N 7/185 340/10.1 |
| 2013/0162852 A1 | 6/2013 | Boyle et al. |
| 2013/0199251 A1 | 8/2013 | Taylor et al. |
| 2013/0229528 A1 | 9/2013 | Taylor et al. |
| 2013/0230293 A1 | 9/2013 | Boyle et al. |
| 2013/0242105 A1 | 9/2013 | Boyle et al. |
| 2013/0286211 A1* | 10/2013 | Cao ........................ H04N 7/181 348/159 |
| 2014/0009632 A1 | 1/2014 | Glover |
| 2014/0204230 A1 | 7/2014 | Boyle et al. |
| 2014/0267744 A1 | 9/2014 | Taylor et al. |
| 2014/0375455 A1 | 12/2014 | Taylor et al. |
| 2015/0143443 A1 | 5/2015 | Boyle et al. |
| 2015/0195451 A1 | 7/2015 | Glover |
| 2015/0208023 A1 | 7/2015 | Boyle et al. |
| 2015/0241546 A1 | 8/2015 | Boyle et al. |
| 2015/0249778 A1 | 9/2015 | Taylor et al. |
| 2015/0312354 A1 | 10/2015 | Boyle et al. |
| 2016/0133295 A1 | 5/2016 | Boyle et al. |
| 2017/0134783 A1 | 5/2017 | Boyle et al. |

* cited by examiner

ABSTRACT# TRACKING CAMERA NETWORK

BACKGROUND

Existence of instrumentation for automatic video recording creates an excess capacity of video recording for those who own automatic video recorders. Others may want to utilize this excess capacity to record their activities but currently there is no system that helps link those who would like to utilize the excess capacity with those that have such capacity. The invention hereof is a solution to the problem of matching excess capacity with demand to use such excess capacity by creating a network of automatic video recorders and tags that are associated with people who want to be recorded. The network allows individual owners of automatic video recording to set their equipment to record other network participants during times when they themselves do not want to be recorded and to record people who either do not own automatic video recording equipment or want to be recorded by additional automatic recorders to obtain footage that is recorded by equipment that they do not possess. As a side benefit, the inventive network has the potential to promote personal relationships, collaboration and friendships among people who participate in it. The inventive network may also become a tool for crowd sourcing video footage and other information regarding high interest events.

DETAILED DESCRIPTION

Figure 1:
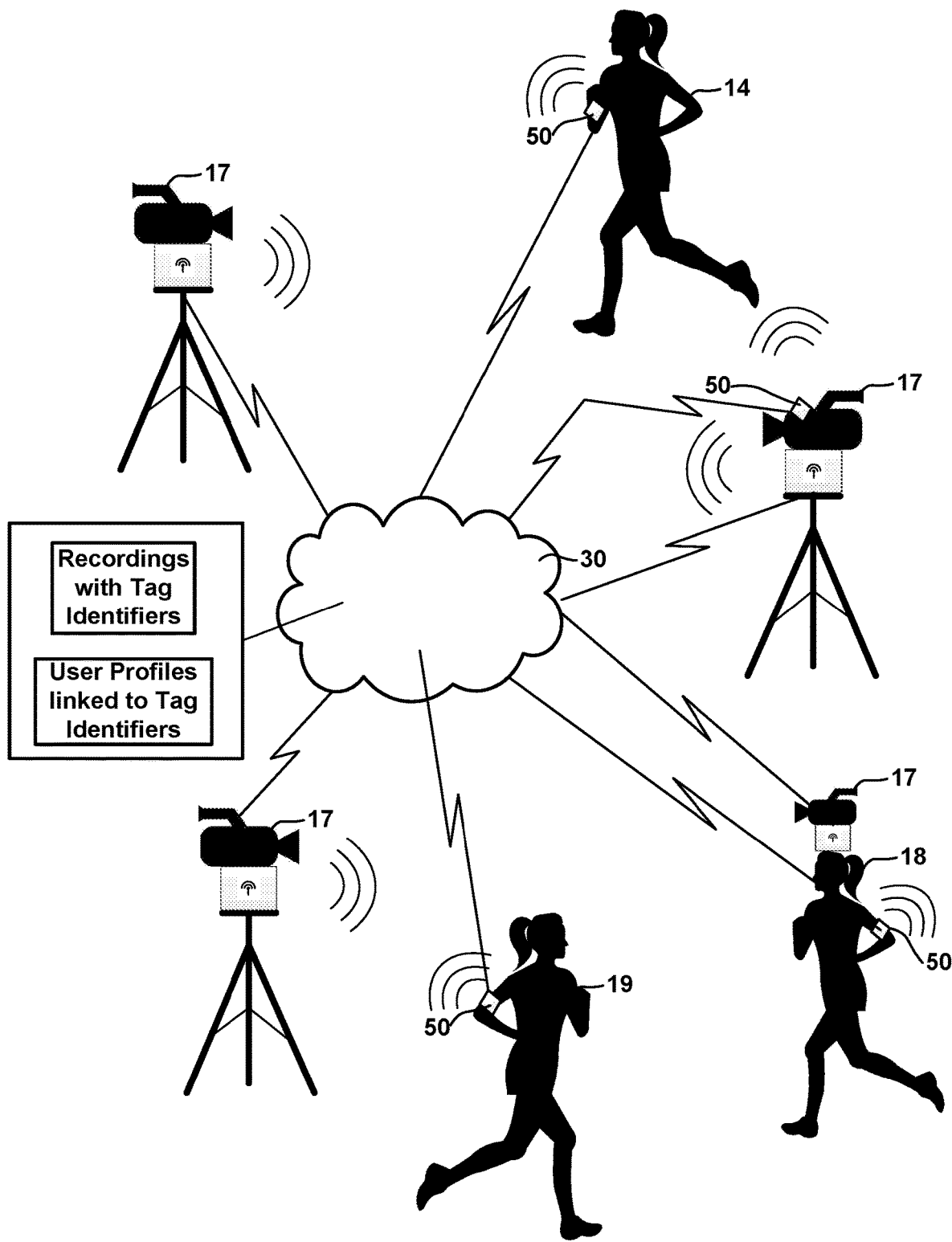
FIG. 1 is a schematic drawing of a tracking camera network using network computer system.

In one aspect of the present disclosure, a content creation, storage, and sharing network based on automated video and photo recording hardware and software is described. One benefit of creating such a network is that capturing high quality content becomes a communal or crowd sourced initiative. Participants in the network may obtain footage of their own activities from multiple vantage points when present at locations where other network participants are also located. Content recorded within the network may be available to the general public if recorded by cameras set to a public mode and if recorded by tracking tags also set to public mode. Participation may be quid pro quo (network participants purchase cameras to film others so they may in turn be filmed by cameras owned by other network participants) or for gain (some participants pay others for footage captured of them while participating in the network). Cameras may be toggled between various settings or operational modes, for example: public (footage recorded by and/or of the participant may be viewed by the general public), hybrid (a user allows other cameras to film the user but does not allow their camera to film other users), quid-pro-quo (a user sets the camera to record anyone in the network whose camera is set the same way; in exchange for filming others when not filming the user, the user gets to be filmed by other cameras; the footage is available through the network to those in the footage) and private (only filming of the user or approved participants in a private group within the network). Other settings may also be available: semi-public (footage may be viewed by network participants but not by others), anonymous (footage may be viewed by others without identifying the recording equipment or its owner), etc. Cameras capable of automatically determining their own location and orientation within a shared coordinate system share such information with the network or with other cameras in the network such that each camera is capable of actively pointing at any other similarly configured camera in the network. Users may choose to wear tags instead of (or in addition to) a camera where the tag reports the wearer's location within the network so that any camera within the network (and in the vicinity of the user) is capable of pointing at the tag, at least when the tag is set to "public" or "quid-pro-quo" operational modes. When set to "private" a tag may be seen by cameras also set to a "private" operational mode. Cameras can be co-located with network participants (such as located on a network participant's helmet, kite, bicycle, automobile, etc.) or may be set up remotely (such as on a beach, soccer field, mountain, etc.) using implements such as tripods, vehicle mounts, etc. For remotely located cameras, an owner may decide to set their camera to public operational mode to benefit from other cameras also set to a public mode. Optionally, such an owner may set their camera to a semi-public operational mode to, for example, monetize the content captured by their remote camera of other network participants when the remote camera is not actively filming its owner (such as when the owner is out of range) or when the owner is not actively doing something worthy of filming and instead records footage of other participants available to them by separate agreement. Further, cameras and tags may be set to public mode enabling the recording of all participants using the same public setting to be recorded, and recordings obtained in this mode available to the public.

In another aspect, the inventive network benefits from a direct network effect where the more users who bring tracking cameras (also referred to as recording units or "RUs" herein) into the network, the more value is created for all users of the network by harnessing the capture capacity of the networked tracking cameras to increase quantity and quality of video captured and shared. The increased quality and quantity of shared video will increase demand resulting in new participants joining the network and resulting in further increased quantity and quality of video capture.

One example use case of such a network involves ski mountains. Individual skiers may wear their own tracking cameras set to "quid pro quo" or to "public" and capable of pointing at other tracking cameras within range. More tracking cameras in use on the mountain will result in higher quantity (e.g., footage from multiple angles) and quality (e.g., closer shots, best angle, etc.) of footage captured of participants in the network. Network connectivity may be utilized by sending an invite to fellow network participants to congregate at a particular slope at a particular time to maximize the network effect. It is important to note that all tracking cameras do not have to be at the same location; rather, multiple cameras at the same general location or venue create the network of the present disclosure. The concept of general location or venue should be understood as an area within which a group of participant carries out their activities. Thus, in the ski mountain example, the general location or venue may be a ski slope. In other situations, it may be an arena, or even a town where, for example, a marathon takes place.

In another example use, a player or coach may use crowd sourced automatically recorded footage of network participants to improve individual and team performance.

As another example use, a network of the present disclosure may be established and used by police, firemen, or even special military units to record activities from different or additional vantage points (supplemental to or in addition to private camera networks used by same). As another example use, officials may decide to tap into the consumer network during times of crisis.

Applicant has previously described recording units comprising modularized cameras, power supply, user control interface, and mounting accessories where the use case (i.e., the activity that is filmed or the activity in which the user participates) defines the battery, the design, location of the user control interface, and mechanical requirements of the mount in U.S. patent application Ser. No. 14/738,520, filed Jun. 24, 2015, titled "Application Dependent Video Recording Device Architecture", such application incorporated herein by reference in its entirety. Applicant has also described a helmet-mounted recording unit (U.S. Pat. No. 8,749,634 incorporated herein by reference in its entirety), mobile recording units which stay pointed at a subject because the subject is wearing a tag (U.S. Pat. No. 8,749,634 incorporated herein by reference in its entirety). The hardware described in the referenced patents and patent applications is a preferred type of hardware employed by the participants of the inventive tracking camera network.

A recording unit, or RU, is a camera associated with an intelligent base (i.e., a control unit). Each RU has self-awareness meaning that the location of the RU is determined and, in some instances, the orientation is also determined. Each RU communicates with other RUs and with the Internet, also referred to as the cloud, and is capable of being oriented in space by commands from the intelligent base. A tag is an electronic device or unit that preferably also has self-awareness (i.e., it "knows" where it is and in some instances, how it is oriented) and/or it may transmit signals used to locate the tag (e.g., infra-red and other electromagnetic radiation) including the broadcast of its location to other RUs and to other tags in its vicinity and/or to the network itself. An example of a device that has self-awareness is a smartphone that determines and stores its location and orientation. In the present disclosure, a smartphone can function as a tag with a smartphone application that identifies it as such. In the present disclosure, each tag is associated with a user in the inventive network. The RU hardware may be stationary, partially mobile, mobile (e.g., mounted to a vehicle), wearable, etc. A recording unit may also be integrated with a tag and thus function as a tag (a recording unit with an integrated tag will be referred to as "RU-tag").

A large capacity networking computer system interfaces with the RUs and tags. The networking computer system is accessed via the Internet. Users gain access to the network computer system by becoming members of the network computer system. A fee may be required to access the network.

A number of camera types may be used with the network of the present disclosure. An RU may be a pan-tilt-roll-zoom (PTRZ) system that includes the appropriate PTRZ hardware and firmware. Some PTRZ cameras come equipped with a fisheye lens where some amount of pan, tilt, roll and/or zoom is accomplished digitally (or by a combination of digital and mechanical). Wearable cameras may also be used. Wearable cameras preferably use a frame stabilizing system to record footage that is not subject to excessive jitteriness due to movements of the user. Such frame stabilizing system may operate using micro-electro-mechanical devices (e.g., accelerometers, gyroscopes, etc.). Use of appropriate RUs may be a prerequisite to recording with the network. One or more RUs are registered to a user in the inventive network (individual persons or otherwise).

As explained above, the RU is self-aware and determines the location and orientation of the RU especially as the user and/or RU moves. An RU may be embodied as a wearable camera and associated with the clothing (e.g., helmet, chest pad, etc.) of a person. An RU may also be embodied as an extension of the user, such as in sporting equipment (e.g., skis, skateboards, boats, surfboards, poles, bicycles, etc.), vehicles, robots, and even animals. The intelligent base may be capable of, among other things, machine learning and image recognition, also known in the art as computer vision (CV), for functions including, but not limited to, improved tracking, facial recognition, or facial anonymization (automatic blurring of persons captured by RUs that have not agreed to have their likeness recorded and/or broadcast).

RUs and tags may be paired to each other, to the network, and/or to private groups within the network. Pairing is effected by user action (e.g., a button press on a user interface). Pairing may also be effected by simply physically contacting, or "bumping", the devices to be paired. Subsequent "bumping" of additional RUs and/or tags may enlarge the circle of hardware that operate together as paired devices. Recognizing coordinated sounds (e.g., coordinated voice activation or clapping) from devices is another pairing method to link hardware together and to the network. Sounds may also be used to mark highlights such as sounds from the user, a network participant or based on ambient noise such as crowd noise.

According to one embodiment of the present disclosure, RUs may be set to an operational mode by their user to "public" or to "private" mode. If an RU is set to "public" mode it automatically tracks and records (films and/or photographs) tags within range. Additionally, an RU may optionally convert to point-of-view (POV) camera mode while waiting for another tag to come within range. When an RU is set to "private", it only tracks and records tags paired with it. As an example, two RU operators can form a private duo: I film you, you film me (see FIG. 5 below).

According to one embodiment of the present disclosure, all RU recorded video is pushed to the networking computer system either in real time or soon after capture such that crowd-sourced video is available to the members of the network according to the member's level of access (public, private, etc.). Some crowd sourced videos are initially only available to the user associated with the tag filmed (note that the expression "the tag filmed" here and elsewhere is intended to encompass the participant associated with the tag filmed); such a user may make his or her footage available to members or even post it to various social media sites. Some videos are available to the participant whose tag was recorded only if (a) that participant has also operated a public RU during the time of filming or (b) a fee has been paid by the same participant. In case (b), the fee may be shared by the operator of the RU and by the operator of the network to encourage more membership in the network (to increase capture capacity and quality) while supporting the costs associated with the network. In some cases, the networking computer system may make video recordings available to the general public.

Figure 4:
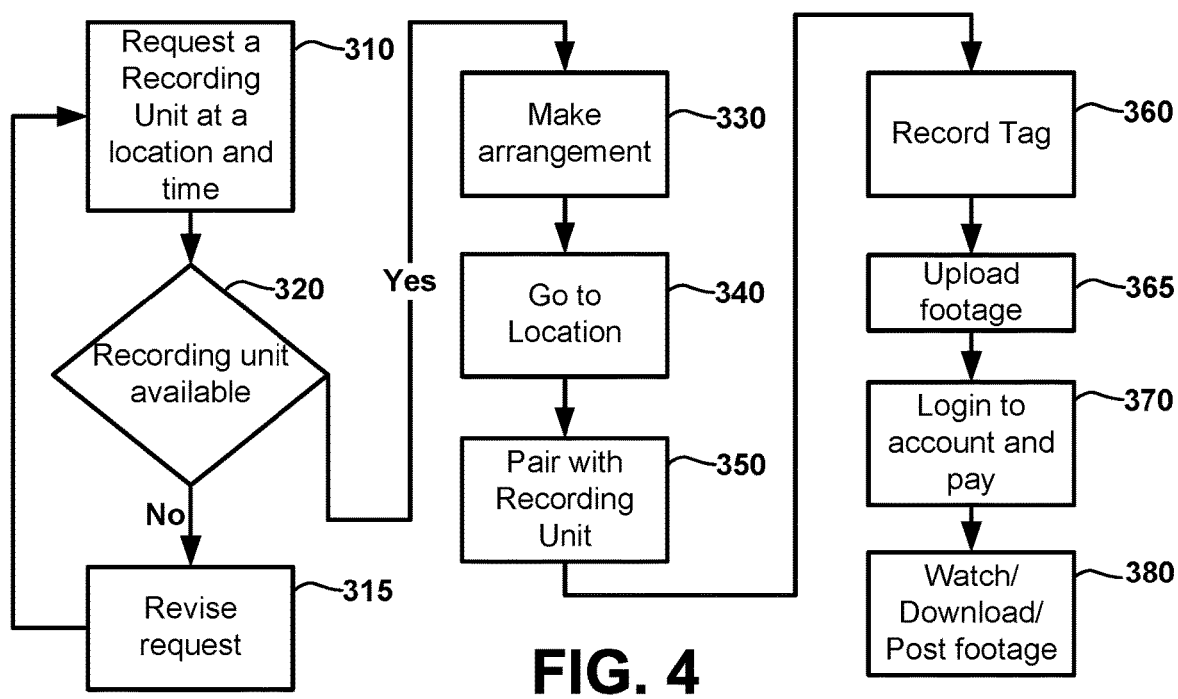
FIG. 4 is a flow chart illustrating a hail-a-camera feature of the inventive tracking camera network.

Another feature of the network of the present disclosure is a "call a camera" feature (see FIG. 4). The "call a camera" feature allows participants to offer their recording services to other participants in the network. A participant who does not have (or does not want to use) their own RU may call upon available RU operators and bring their tag to a venue or use their smartphone as the tag. The user may get more RU operators than desired and may accept or reject filming offers prior to filming or after filming based on the quality of crowd sourced footage captured by responding RUs. The participant who records the footage may benefit by receiving a fee (as described above). According to another feature, a participant can announce their activity schedule within the network and carry their tag. Other users could bring recording units to the announced venue, set them to a "public" operation mode, and record footage. If the footage is viewed by the user of the tag, the person who recorded it is rewarded with a payment. In still other cases, a particularly influential user could invite fans to a location to crowd capture their activity such as a stunt.

According to another feature of the network, participants may share cameras (recording units) with strangers. For example, the more tracking helmet cameras present on a mountain slope, the more filming angles a person may get about their own skiing experience. In this case, all footage may be available to all users who participate with filming in the network. Mountain operators may rent or loan units for free to mountain users to enable participants to capture high quality video of their fun to be shared on the network and attract users to the mountain. People who only want to wear tags (or use their smartphones as tags) and not film others may purchase their footage and part of the fee goes to the users of cameras who captured the footage, the operator of the mountain facility, the network operator or some combination thereof. Recorded footage may be made available in chronological order or as alternative footage if same event is filmed from different angles.

In one embodiment of the present disclosure, computer vision is used to identify participants in the network and blur out faces of people who are not participating in the network such as by recognizing their profile created during network signup.

In one embodiment of the present disclosure, only certain segments of video captured of participants associated with highlights (whether captured by their own camera operating in a point of view or action mode or captured by network tracking cameras or both) are pushed to the networking computer system such that a user has all highlights in one location immediately accessible from all devices while limiting the amount of data being pushed to the cloud. See International Patent Application No. PCT/US2015/059788, filed Nov. 9, 2015, titled "EDITING SYSTEMS", incorporated herein by reference in its entirety, describing a method of automatically selecting highlights is described in detail.

People may also participate in the network and be recorded without acquiring any extra hardware. As described herein, a smartphone may be used as a tag. These users may take advantage of crowd-sourced video cameras in the network while the RU owners may be rewarded with a fee for providing use of their RU in the network.

Users may also use their smartphone camera with the network or use hardware like drones to capture interesting moments, background, and supporting footage from a specific time and location (such footage is often referred to a "B-roll", e.g., sunsets, after ski cocktails, a ride to the beach, etc.). B-roll moments can be offered to members for free or for a fee as additions to each user's saved footage and/or as filler material for a summary edit that may be automatically provided by the network. The network may employ a voting system to quickly find B-roll that members like or a combination of crowd data and user preferences to find the B-roll a specific user may like included in their videos or news feed.

The network can support independent robotic capture devices such as robotic cameramen and drones. Users may operate drone RUs or fixed or partially mobile RUs with zoom capabilities and either set them to private or public operation mode or some combination. This allows network participants to share or even capitalize on the unused capture capacity of their robotic cameras and drones when they are out of range (too far away for themselves to be the subject) or if their camera determines it can capture a better shot of a different network participant. Such a user may also set a hierarchy which tells their cameras when to film/photograph them (the user itself) versus other users of the network. For example, a user may set their RUs to track itself within a specific range and only to track and film other network participants if the user is out of range. As another example, a static or partially mobile RU may default into time-lapse or motion time-lapse mode where the unit captures time-lapse B-roll to be offered to the network (again taking advantage of excess capture capacity).

Said network of tracking pointing devices may also be used as a series of directional antennas to increase the range of any particular component. Such network of tracking pointing devices may also be used to relay power wirelessly such as by connecting a wireless power transmitter and a wireless power receiver. Such wireless power transfer systems have high loss with distance characteristics and can benefit greatly from networked tracking directional antennas to, for example, relay power from a ground station to a drone to increase the drone's limited flight time.

A network of RUs and tags that communicate with each other and the networking computer system may operate in different ways. The following are examples and elements (steps) of the systems and methods of operation of the inventive network, hardware and software.

The network comprises a multiplicity of cameras. Cameras may be set up at various locations, worn, positioned on moving objects, carried, etc. The cameras may be set to various operational modes.

In another embodiment of the invention users may set a camera worn on their head to "public" meaning their camera would point at and record whoever else was wearing their own camera that is also set to "public". If there are multiple "public" cameras, a selection would take place; different criteria could be set for such selection. For example, there could be a circle of other members of the network designated as "friends" identified for the user; these friends may get recording preference. Alternatively, a variety of selection criteria such as closeness to the camera, speed, VIP status, etc., may be used. Certain users may pay to get priority access to be filmed/photographed by RUs such as in crowded conditions. Users on both sides (tracking camera and tag users) of the network may be alerted to such conditions so they can either take advantage of the monetization opportunity or to ensure they are filmed. Users could also pre-set their accounts for such situations and where such situations could be handled as an auction.

A fixed RU (e.g., an RU mounted on a tripod) in the network could be either in public or in private mode. When in public mode, the RU would track users that have their body/helmet camera or tag set to public.

As previously described, footage is automatically uploaded to the networking computer system and members of the network can access any footage recorded by any public camera that was pointed at them in near real time, at some point throughout the day or in the future. However, if the user did not also operate an RU set to "public" (had their RU set to private or did not operate an RU at all) a fee may be required for that member to view footage obtained from users who participated in the capture of the footage while in a public operational mode. A fee may go to the "public" participating users to incentivize participation. Uploaded footage is preferably placed in the account of the user who is filmed (i.e., the subject the particular footage). Such footage may not be accessible to other users, even to those whose RU produced the footage, without sharing by the subject of the filming.

Members that are friends can create "private groups" within the network to get group footage without accessing cameras in public mode. This creates a true direct network effect where each new camera increases the value of all existing cameras.

FIG. 1 is a schematic drawing of a tracking camera network using network computer system 30. The tracking camera network comprises a multiplicity of tracking cameras 17 (also referred to herein as recording units) configured to determine and store their location and orientation. A multiplicity of tags 50 associated with users 14, 18, and 19, are tracked and recorded by tracking cameras 17. Tags 50 are configured to determine and to broadcast their locations and to broadcast tag identifiers and to identify users in the network. The tag identifier is user information that will be stored as metadata to identify a user with recorded footage. Tracking cameras 17 are configured to recognize tags in the network. Tracking cameras 17 are configured to recognize tags that are in an area where they can record a tag or tags 50. Tags that are too distant, for example, will be out of a recordable area. Tracking cameras 17 are configured to obtain recordings of some of the tags. Certain tags may not be present to be recorded or may be deselected due to hierarchy preferences as described herein. Tracking cameras 17 are configured to store the tag identifiers in the recordings, or footage, recorded. Computer system 30 is configured to exchange communications with tracking cameras 17 and tags 50. Computer system 30 is configured to receive and store the footage recorded by the tracking cameras 17. Computer system 30 is configured to make footage available to the users associated with the tags in the footage. This is done with a user profile of a user linked to a tag identifier.

Figure 2:
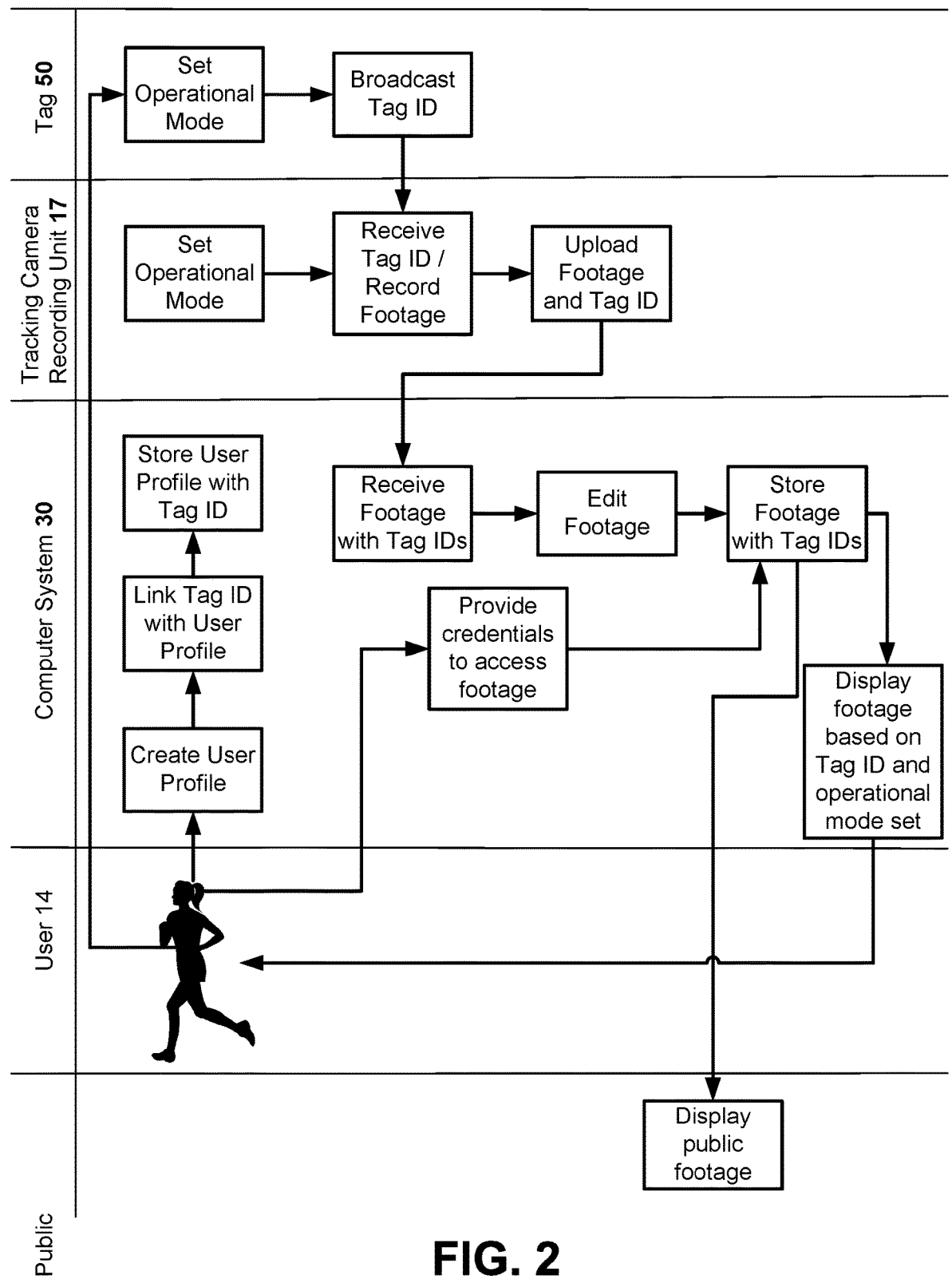
FIG. 2 is a schematic diagram illustrating relationships of the tag, tracking camera, computer system, and user.

FIG. 2 is a schematic diagram illustrating relationships of the tag 50, tracking camera 17, computer system 30, and a user, e.g., user 14. An operational mode (public, private, quid-pro-quo) is selected for tag 50 by user 14 and for tracking camera 17. The operational mode set for the recording unit may be set by the owner of the recording unit who may or may not be user 14. Discussion of the operational modes is described in FIG. 3. A tag identifier is broadcast by tag 50. Tracking camera 17 receives the tag identifier. Tracking camera records footage and uploads stored footage with tag identifiers to computer system 30. Computer system 30 receives the footage and it is stored with tag identifiers. The footage may be edited. The footage is stored for access by users. Use 14 gains access to the computer system by creating a user profile and given credentials to access the computer system (e.g., login and password) and the user profile is linked to a tag identifier. The user can access footage from computer system 30 based on the operational mode set on tag 50 and it will be made available to user 14 according to the operational mode set and the tag identifier of the user. User 14 creates a user profile with computer system 30 and a tag identifier is linked with the user profile and stored. To access footage, user 14 provides credentials to access footage on computer system 30. Footage is displayed to user 14 based on the tag identifier and the operational mode of the tag during the recording. Footage may also be made available to the public as discussed further herein.

Figure 3:
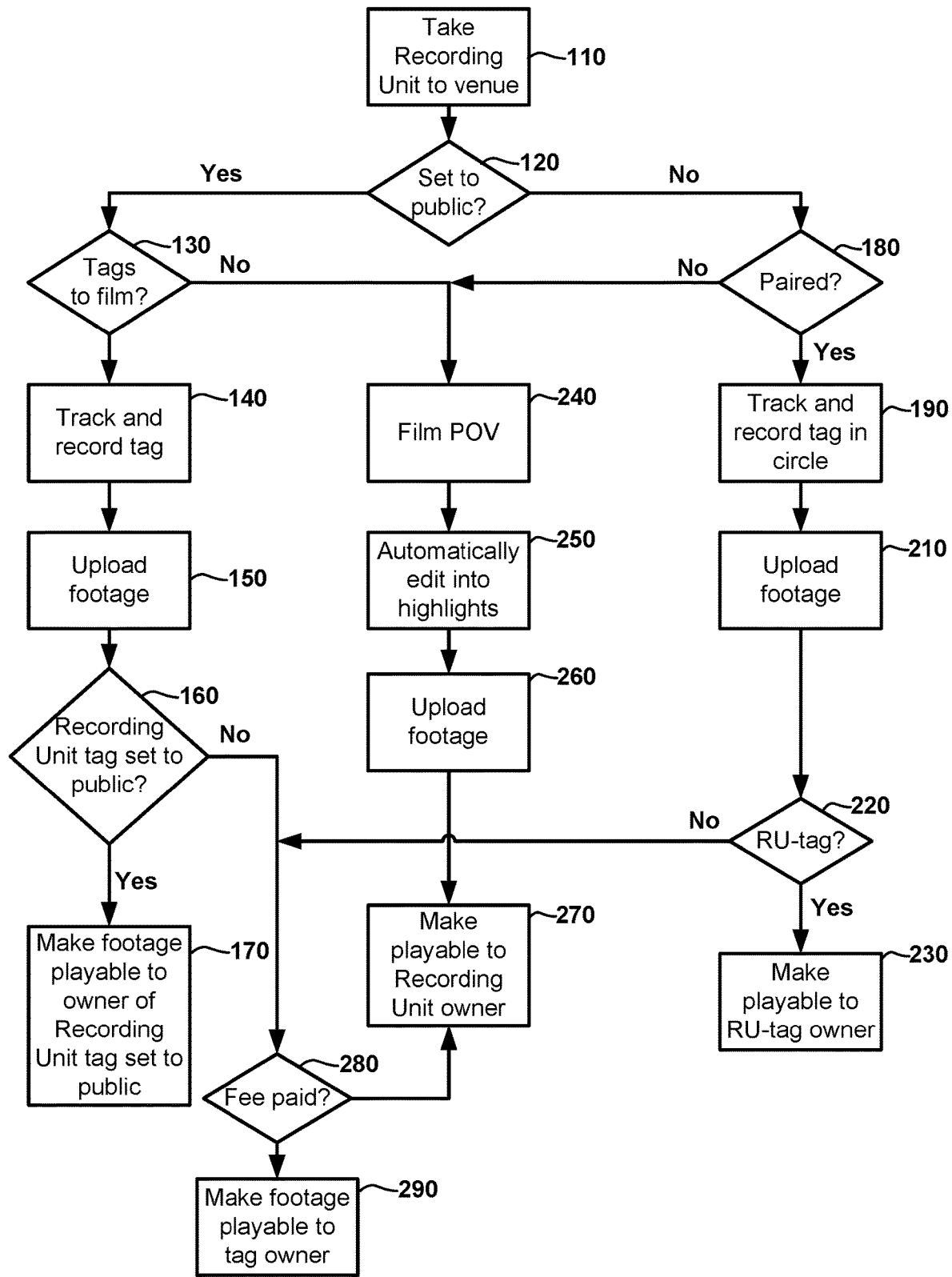
FIG. 3 is a flow chart illustrating the operational scheme of a recording unit of the inventive tracking camera network.

FIG. 3 is a flow chart of a preferred operational scheme of the network of the present disclosure. More particularly, FIG. 3 depicts the operation of a recording unit in the network. In step 110, the user takes the tracking camera to a venue, i.e., a location where the recording unit will be used to record activities of the user themselves or of others in the network. It is implied in this step that the user not only brings the tracking camera/recording unit to the venue but sets it up and carries out all necessary preparations to make it ready to record. In step 120 the user decides whether the camera is set to public operation mode or not. If public mode is selected, the recording unit determines whether or not there are others at the venue with tags to track and to record, step 130. If yes, the tracking camera will be oriented to one of the tags present and track and record it, step 140. Tags may or may not be set to public operation mode. In such a circumstance, tags not set to public mode are not among those determined to be tracked and recorded in step 130. Tags may be set to private if owners do not want to be filmed or want to be filmed within a private group only. In step 140, if there are multiple tags that could be tracked and recorded, the recording unit makes a choice among the tags according to some additional settings. The choice (designation of highest priority tag) may be based on the distance of tags, their velocity, or on a ranking of the tag's owner. The tracking camera makes the choice amongst competing tags automatically based in part on its settings and in part on network policies. Recorded footage is uploaded to the network computer system, step 150. Footage may be uploaded after a recording unit stops recording a chosen tag or continuously during filming. Step 140 is complete when, for any reason, recording unit stops recording a chosen tag, either the sole tag or a highest priority tag. Recording may stop for many possible reasons, for example, a tag may move too far to be recorded, the user of the tag may stop the activity, another tag may become higher priority, etc. After footage has uploaded in step 150, the network determines whether the filmed tag was a tag associated with a recording unit set to public, step 160. If yes, the footage becomes playable for the owner of the tag who participates in the network by having a tracking camera set to public, step 170. When steps 160 and 170 are completed practically instantaneously, the user of the tag may view the footage almost in real time. If the tag is not associated with a camera set to public during the time of recording (No in step 160), a fee may be paid by the owner of the tag (step 280) and if so, the footage becomes playable for the owner of the tag, step 290. If no fee is paid, the footage is playable for the RU owner, step 270. This would be the case, for example, when a camera on a tripod on the beach is set to public and it happens to film the owner who is surfing nearby, wearing a tag which is also set to public while others are not around.

Returning to step 120, if the tracking camera is not set to public, it may or may not be paired to any tags. One or more recording units and tag or tags paired constitute a circle. In FIG. 3 we are describing one recording unit, but the figure and the description applies to all recording units in the network or in the circle. If the recording unit is not public but it is paired to one or more tags, it will track and record the paired tag within the circle, step 190. If multiple tags are paired, a hierarchy is applied as described above with respect to step 140. When recording is complete, the footage produced is uploaded to the network computer system in step 210. If the tag recorded is also a recording unit (an RU-tag) that was set to record simultaneously (this is decided in step 220), the owner can play, copy, download the video, step 230. If the answer in step 220 is No, then the tag owner must pay a fee (step 280) before the recording becomes playable, step 290. Step 210 may also occur as a streaming process during recording.

Returning now to step 180, if the recording unit is not public and is not paired, it is set to POV mode, step 240. Alternatively, the recording unit could be set to record B-roll footage. Alternatively, the recording unit may also go into battery save mode. The same outcome applies also if there are no tags to film (No in step 130). The same outcome applies also if the recording unit is set to private (No in step 120) and it is paired (Yes in step 180) but there are no tags to record, although this eventuality is not shown in FIG. 3 to keep the figure readable. Once POV filming is complete, the automatic edit function of the network may be applied to the footage. Automated editing is applied to reduce the POV footage to its highlights (the most important moments) in step 250. The resulting footage is uploaded to the networking computer system in step 260, and is made playable to the owner of the recording unit in step 270.

FIG. 4 is a flowchart that illustrates a "hail a camera" method of the present disclosure. A participant in the inventive network possesses a tag, either a dedicated tag or a smartphone or similar device that is equipped with a localization device (e.g., GPS), signal transmission device(s) (e.g., a radio transmitter), and an application that, when turned on, makes the smartphone/device "visible" within the network. An additional app may then be used to request a recording unit from participants in the network to record the tag owner's activity at a specific location and time, step 310. If a participant with a recording unit is available and willing to provide the recording service requested in step 310, then an arrangement can be made between the two parties to record the activity in step 330. (The requestor may offer a payment or reward in exchange for being recorded.) In step 340, at least the tag owner goes to the requested location and time. The recording unit should be present at the location, but the owner of the recording unit need not be at the location. In step 350, the recording unit and tag are paired. In step 360, the tag is recorded. Once the activity is completed, the recorded footage is uploaded to the network computer system (step 365). Next, in step 370, the network participant who requested the recording accesses the network computer system to watch, download, post, etc. the footage. In step 370, the user logs in to his or her account and pays a fee before able to access the recorded footage in step 380. Returning to step 320, if no RU is available for the recording, a revised request may be made (No in step 320). The revised call (step 315) may include revision of time and/or location, as well as revision of reward the requester is willing to offer in return for the recording service.

Figure 5:
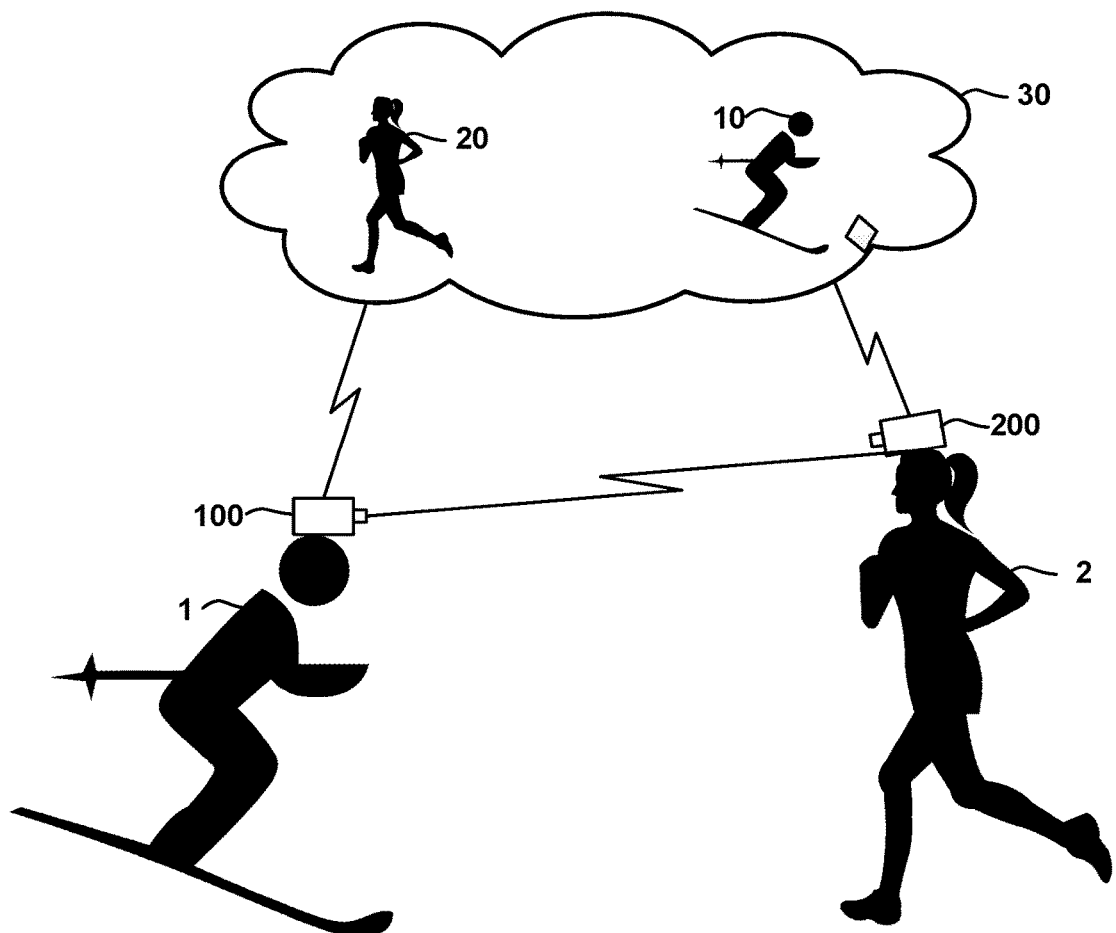
FIG. 5 is a depiction of the elements of the inventive network using the example of a filming duo.

FIG. 5 is a schematic diagram that illustrates an example of the operation of the inventive tracking camera network. In this "I film you-you film me" example of FIG. 5, participants 1 and 2 are simultaneously engaged in activities in each other's proximity. Both participants are equipped with tracking cameras 100 and 200, respectively, these cameras serve also as tags, and are paired to each other's cameras. Participant 1 records participant 2 and the resulting footage 20 is uploaded to the networking computer system 30. Participant 2 at the same time records participant 1 and the resulting footage 10 is uploaded to the networking computer system 30 as well. The footage is then available to both participants.

The cameras used in the network may be small sized (body wearable such as on helmets), medium sized (mobile and/or portable but capable of pointing longer zoom lenses or other larger devices, longer battery life but not too heavy) or even larger sized and even fixed cameras (such as cameras installed at mountains, or beaches by resorts or by municipalities, etc.).

Automatic editing in an arrangement similar to that illustrated by FIG. 5 may operate in the following way: Camera 1 is with a father and Camera 2 is with his son; Father's camera experiences high acceleration at time T1 with the signature of a crash. Son's camera does not experience anything unusual, but is by definition, watching the father's camera and vice-versa. The editing system identifies the crash in son's footage as a highlight at T1. The editing system may be set to also identify as a highlight the footage around time T1 in the footage recorded by father's camera because this footage may show son's reaction to the crash. Cameras are time synchronized when connected, so T1 is the same moment in time for all cameras in a network. Also, the editing system may cut these highlight clips together in such a way as to show the two perspectives, and reactions, to the same incident.

The system is capable of handling many scenarios. Cameras may be connected and push the recorded highlights to the networking computer system based on what the subject experienced regardless of which camera (or which cameras, if more than one) filmed it.

When two cameras are paired to film each other and there is no subject close enough to film, the camera switches to POV mode and pushes highlights when it detects highlights.

When using a traditional tripod mounted automatic recording apparatus, such a camera may track the nearest subject and if no subject is in range, it may switch the camera to another mode such as motion time-lapse or astro-tracking to capture B-roll for offer to private or public network participants. A recording unit may also go into battery save mode when no suitable subject is in range.

In the event that a camera or recoding unit cannot connect to the network computer system, footage is uploaded the next time a connection is available.

Figure 6:
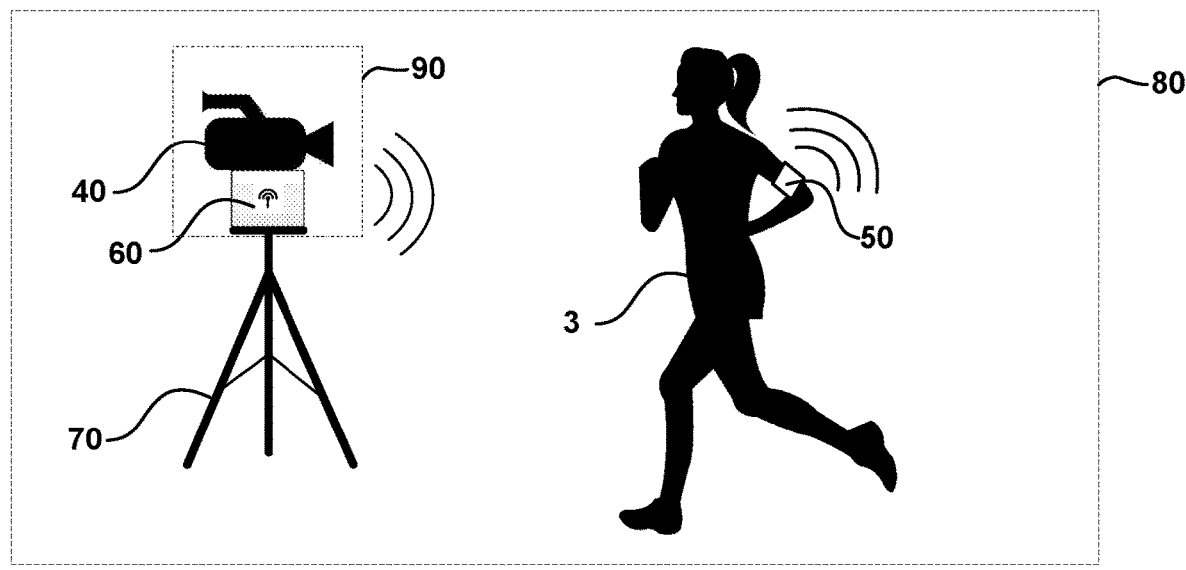
FIG. 6 is a depiction of the major components of the inventive networkable automated recording system wherein the network is not operated through a networking computer system.

The network of automated video recording may be designed to operate without a networking computer system. This is made possible by improvements in the design of the tracking cameras that may participate in such a system. FIG. 6 shows the major components of the inventive networkable automated recording system that operates without a networking computer system. A very limited example of network 80 of networkable automated video recorders and tags is shown in FIG. 6; network 80 comprises a multiplicity of networkable tracking cameras 90 and a multiplicity of networkable tags 50 (FIG. 6 shows only one of each of these components for clarity in the drawings). A networkable tracking camera 90 typically comprises camera unit 40 and orientation device plus control unit, referred to as base 60. Camera unit 40 may be a traditional video camera (or DSLR camera, or the like), or it may comprise only some essential elements of a traditional camera (lens system and image capture device, such as a sensor plate) all other components of camera unit 40 may be integrated with base 60. Network 80 may comprise a mixture of networkable recording units 90 with various system architectures. Networkable tracking camera 90 may be supported by tripod 70 as shown in FIG. 6, but it may also be worn on a helmet similar to recording units 100 and 200 shown in FIG. 5, or it may be mounted on a variety of other fixed or mobile implements.

Networkable tag 50 is shown in FIG. 6 as attached to the arm of participant 3. The attachment may be accomplished using an armband, for example. Network 80 typically comprises a multiplicity of networkable tags 50; each such tag being worn or otherwise associated by a user (or by an animal or an object that the user wants to get recorded instead of recording self) more or less directly. For example, if the user places a tag 50 on a flying drone or airplane, that object will stand in place of the user as the subject of the recording but the user still will be associated with the tag because the tag's identifier will point the system (and users in the system) to the user who owns the tag. An exception may be created when an owner of a tag 50 temporarily assigns another person as being associated with their tag. This may happen when a tag is loaned to someone by a friend or by an operator of many tags, such as a resort or a sports club. Operators such as resorts and sports clubs will likely operate multiple networkable tracking cameras. Thus, tag 50 may be associated with user 3 by physical connection and proximity as in FIG. 6 or only by ownership. In the latter case, tag 50 may be associated by physical connection (and by proximity) to a temporary user. This distinction may become significant if a recording created in the network is available to the user only. In this case, the user may be the one temporarily assigned to tag 50 (rather than the owner of the tag).

Tag 50 is detectable and trackable by networkable tracking camera 90. Tag 50 may be equipped with a location detection device such as GPS or similar antennas that serve to locate tag 50. Tag 50 may also be equipped with a number of other devices that facilitate automated cooperative tracking such as radiation sources that may be used in line-of-sight locating of tag 50, and with a number of inertial measuring units (IMU) to further facilitate tracking. Tag 50 is equipped with user controls and optional displays that permit a user to select operational modes (private, public, etc.) and other options if desired. Tag 50 is capable of transmitting a unique user identifier that enables networkable recording devices to recognize tag 50 as a member of the network. In some embodiments, tag 50 may be capable of receiving and storing footage recorded by automated recording devices in the network. Tag 50 may also be embodied as a smartphone that is running an application that enables it to participate in the network as a tag. In an embodiment of the present disclosure, the user identifier is added as metadata to the recordings enabling networkable tracking camera 90 to recognize different users in different portions of a recording. In some embodiments of the present disclosure, users in some recording may be recognized based on computer vision software application.

Both networkable automated recording unit 90 and networkable tag 50 are equipped with communication devices, such as radio transceivers and antennas, to facilitate connectivity with any number of other networkable devices. Such communications may be direct (between network participants) or they may be facilitated by outside equipment that is not part of the network (such as transmitting towers, etc.).

Figure 7:
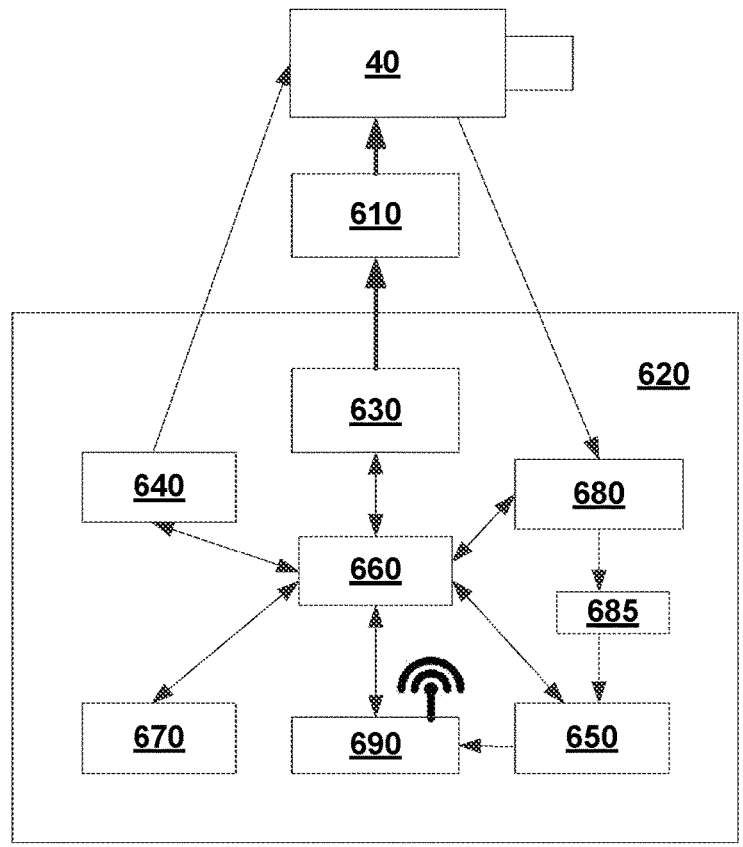
FIG. 7 is a schematic diagram of an embodiment of the networkable automated video recording unit.

FIG. 7 is a schematic diagram of an embodiment of the networkable automated video recording unit 90. Unit 90 comprises camera unit 40, orientation device 610 and control unit or base 620. In many specific embodiments the combination of camera unit 40 and orientation device 610 amounts to a PTZ camera; in other embodiments, as discussed above (regarding FIG. 5) parts of a conventional camera may be incorporated in a camera controller 640 and for the storage of recordings storage device 680 may be used. Base 620 comprises tracking controller 630, camera controller 640, networking device 650, CPU 660, interactive display 660, storage device 680, buffer 685, and communication device plus antenna 690. The entire operation of base 620 is controlled by CPU 660. CPU 660 operates according to user input accomplished by operating interactive display 670. The user sets operational modes (such as public, quid-pro-quo, private, etc., explained above), pairs the device with any number of tags 50, and sets other preferences (such as recording quality, for example) using interactive display 670.

Automated tracking may be performed in a variety of ways and CPU may support one or more tracking methods. In one embodiment of the present disclosure, base 620 also comprises a GPS antenna (not shown) or similar device to locate camera 40 and a number of inertial measurement units (not shown) to facilitate tracking if the tracking camera is mounted on a mobile platform. Tracking may be GPS based, line-of-sight based, and image recognition based or any combination of these, or it may be based on any other known tracking method. For example, tracking may be done using fisheye camera optics without unit 610 to orient the camera using image recognition tools and selecting the appropriate sections of recorded frames.

In some embodiments, camera controller 640 may only perform on/off and zoom/focus functions. In other embodiments camera controller 640 may also perform the image capture function (not shown in FIG. 7; such architecture would obviate the connection between camera 40 and storage device 680 and would require connecting camera controller 640 to storage device 680).

According to the embodiment shown in FIG. 7, recordings are saved in storage device 680. Preferably, CPU 660 is capable of automatically editing the recordings, to select highlights, divide the recording into highlight clips and add as metadata to each clip a unique identifier of the tag tracked while the clip was recorded.

Networking device 650 stores networking information for connecting network participants and directs communication device 690 to send signals to establish contacts with network participants. Networking device 650 also stores operational mode information such as regarding pairing and operating in a particular mode and selects addresses for sending video clips (or series of images in the case of DSLR recording) according to the operational mode settings in effect for the recording session. The clips may be stored in storage device 680 and may be pushed through buffer 685 for smoother transmission if video streaming is desired. Depending on operational mode setting tracking camera 90 may not retain footage and clips of some recording when in quid-pro-quo mode the recording is set to "anonymous". In this case recorded clips are transmitted to tags recorded (or to other devices specified by tag users) and the recorded user does not receive information that would identify the recording device and the user of the recording device never sees the clip they recorded.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A collaborative recording method comprising the steps of:
- providing a computer system configured to establish connections with participants in a recording network, wherein the participants comprise a multiplicity of recording units, tags, and users, and said tags are devices that assist said recording units to automatically track users and assist in identifying particular users;
- receiving information from participants as being ready to participate in the recording network including their locations and their identifiers;
- grouping participants according to their locations with other participants in the same general location, so that participants are in the same general location if recording units within the same general location are capable of recording at least some of the participants during their activities in the same general location;
- enabling to establish connections between participants within a group if said group comprises at least two recording units and at least a tag, or at least one recording unit and at least two tags or at least one recording unit and one tag and two users;
- receiving and storing automatically recorded footage from at least one recording unit in said group;
- identifying portions of said automatically recorded footage as being automatically recorded of particular participants;
- making the automatically recorded footage portions available to those particular participants identified as having been recorded in those portions of the automatically recorded footage;
- registering whether quid-pro-quo mode was set for said recording units and tags, and
- selecting portions of the automatically recorded footage that was recorded by recording units and of tags for which quid-pro-quo mode was set and making the selected portions of the automatically recorded footage available to users of the tags recorded in said portions but not to other users.

2. The method of collaborative recording of claim 1 also comprising the step of automatically editing the automatically recorded footage.

3. The method of collaborative recording of claim 1 also comprising the steps of registering whether public or private mode was set for said recording units and tags, and making footage of a tag in public mode recorded by a recording unit in public mode available for all participants in the network.

4. The method of collaborative recording of claim 1 also comprising the steps of:
- communicating a request by a first participant associated with a tag to be tracked and recorded at a particular place and time to participants in the network;
- receiving a response from a second participant willing to record the first participant at the place and time requested by the first participant;
- making the recorded footage available to said first participant.

5. An automated and networkable tracking camera system, said camera system comprising:
- tracking cameras to film participants in a network and tags associated with said participants;
- said tracking cameras and tags are configured to communicate with each other; said communication comprising messages that identify said tracking cameras and tags as participating in said network;
- said tracking cameras are configured to automatically track tags and to record footage of at least of some of said participants;
- said tracking cameras are configured to recognize said participants in said recorded footage;
- said tracking cameras are configured to separate said footage into clips of recognized participants;
- said tracking cameras are configured to automatically send said clips to participants recognized in said clips; and said automated and networkable tracking camera system is configured to allow said tracking cameras and tags to select among modes of operation comprising a first mode where any member of the public when associated with a tag may be recorded by any of said tracking cameras, a second mode where a group of users operating both tracking cameras and tags pair each tracking camera to all the tags in the group and record one another only, and said tracking cameras are configured to recognize a selected mode of other tracking cameras and tags in the network.

6. The automated and networkable tracking camera system of claim 5 also configured to allow pairing tags and tracking cameras whereby paired tracking cameras record only tags paired with them and paired tags are recorded only by cameras paired with them.

7. The automated and networkable tracking camera system of claim 5 also configured to automatically edit recorded footage by selecting highlights in the recorded footage, such as to separate highlights containing footage parts into clips, to add metadata to the clips identifying users recorded in each clip and making each clip available to users recorded in said clips.

* * * * *